(12) United States Patent
Wu

(10) Patent No.: US 8,950,276 B2
(45) Date of Patent: Feb. 10, 2015

(54) TORQUE SENSING APPARATUS

(76) Inventor: Mu-Chuan Wu, Tainan (TW)

( * ) Notice: Subject to any disclaimer, the term of this patent is extended or adjusted under 35 U.S.C. 154(b) by 204 days.

(21) Appl. No.: 13/547,821

(22) Filed: Jul. 12, 2012

(65) Prior Publication Data

US 2014/0013861 A1  Jan. 16, 2014

(51) Int. Cl.
*G01L 3/00* (2006.01)

(52) U.S. Cl.
USPC ...................................................... 73/862.08

(58) Field of Classification Search
CPC .......................................................... G01L 3/22
USPC .............................. 73/862.08, 379.01–379.09
See application file for complete search history.

(56) References Cited

U.S. PATENT DOCUMENTS

2010/0009815 A1* 1/2010 Chen et al. ...................... 482/63

FOREIGN PATENT DOCUMENTS

GB    2321969 A  *  8/1998  ............... G01B 7/31

* cited by examiner

*Primary Examiner* — Lisa Caputo
*Assistant Examiner* — Brandi N Hopkins
(74) *Attorney, Agent, or Firm* — Birch, Stewart, Kolasch & Birch, LLP

(57) ABSTRACT

A torque sensing apparatus has a torque adjusting assembly and a non-contact sensing assembly. The torque adjusting assembly has a fitting unit, a regulating rod and a regulating seat. The non-contact sensing assembly has a first device and a second device. The regulating rod is rotatably mounted through the fitting unit. The regulating seat is movably mounted on the regulating rod and located outside the fixed plate of the fitting unit. The first device is mounted on the fixed plate. The second device is mounted on the regulating seat and kept from contacting the first device. The non-contact sensing assembly detects a change of the distance between the first device and the second device and generates a signal to a controller, and the controller gauges a torsional value of the torque adjusting assembly. Therefore, the non-contact sensing assembly is not abraded and increases the precision of the torque sensing apparatus.

10 Claims, 5 Drawing Sheets

TORQUE SENSING APPARATUS

BACKGROUND OF THE INVENTION

1. Field of the Invention

The invention relates to a torque sensing apparatus, and more particularly to a torque sensing apparatus applied to athletic equipments.

2. Description of Related Art

A torque sensing apparatus is mounted on an athletic equipment such as an exercise bike to detect a torsional resistance of a torque supplier of the athletic equipment. Therefore, users can adjust the torsional resistance based on the detected results to fit with different needs of the users.

A conventional torque sensing apparatus has a variable resistor electrically connected to a controller of the athletic equipment. The controller detects a resistance value of the variable resistor changed with a movement of a connecting point of the variable resistor. The controller gauges a value of the torsional resistance of the torque supplier according to a change of a terminal voltage of the variable resistor.

The torque sensing apparatus can gauge the value of the torsional resistance of the torque supplier in cooperation with the controller of the athletic equipment. However, the variable resistor of the torque sensing apparatus is an adjustable contacting type. After the variable resistor of the torque sensing apparatus is operated repeatedly, the variable resistor of the torque sensing apparatus is abraded easily and decreases the precision of the torque sensing apparatus.

To overcome the shortcomings, the present invention provides a torque sensing apparatus to obviate the aforementioned problems.

SUMMARY OF THE INVENTION

An objective of the invention is to provide a torque sensing apparatus to increase the precision of the torque sensing apparatus.

The torque sensing apparatus comprises a torque adjusting assembly and a non-contact sensing assembly. The torque adjusting assembly has a fitting unit, a regulating rod and a regulating seat. The non-contact sensing assembly has a first device and a second device. The fitting unit has a fixed plate. The regulating rod is rotatably mounted through the fitting unit and has a threaded part protruding out of the fixed plate of the fitting unit. The regulating seat is movably mounted on the threaded part of the regulating rod and is located outside the fixed plate of the fitting unit. The first device is mounted on the fixed plate of the fitting unit. The second device is opposite the first device and is mounted on the regulating seat. The second device is kept from contacting the first device.

Users can turn the regulating rod to move the regulating seat axially along the regulating rod. Turning the regulating rod changes a distance between the fixed plate and the regulating seat and a distance between the first device and the second device. One of the first device and the second device detects a change of the distance between the first device and the second device and then generates a signal.

Accordingly, the first device is kept from being in contact with the second device. The signal is provided to a controller, and the controller gauges a torsional value of the torque adjusting assembly according to the signal. Thus, the non-contact sensing assembly is not abraded and increases the precision of the torque sensing apparatus.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
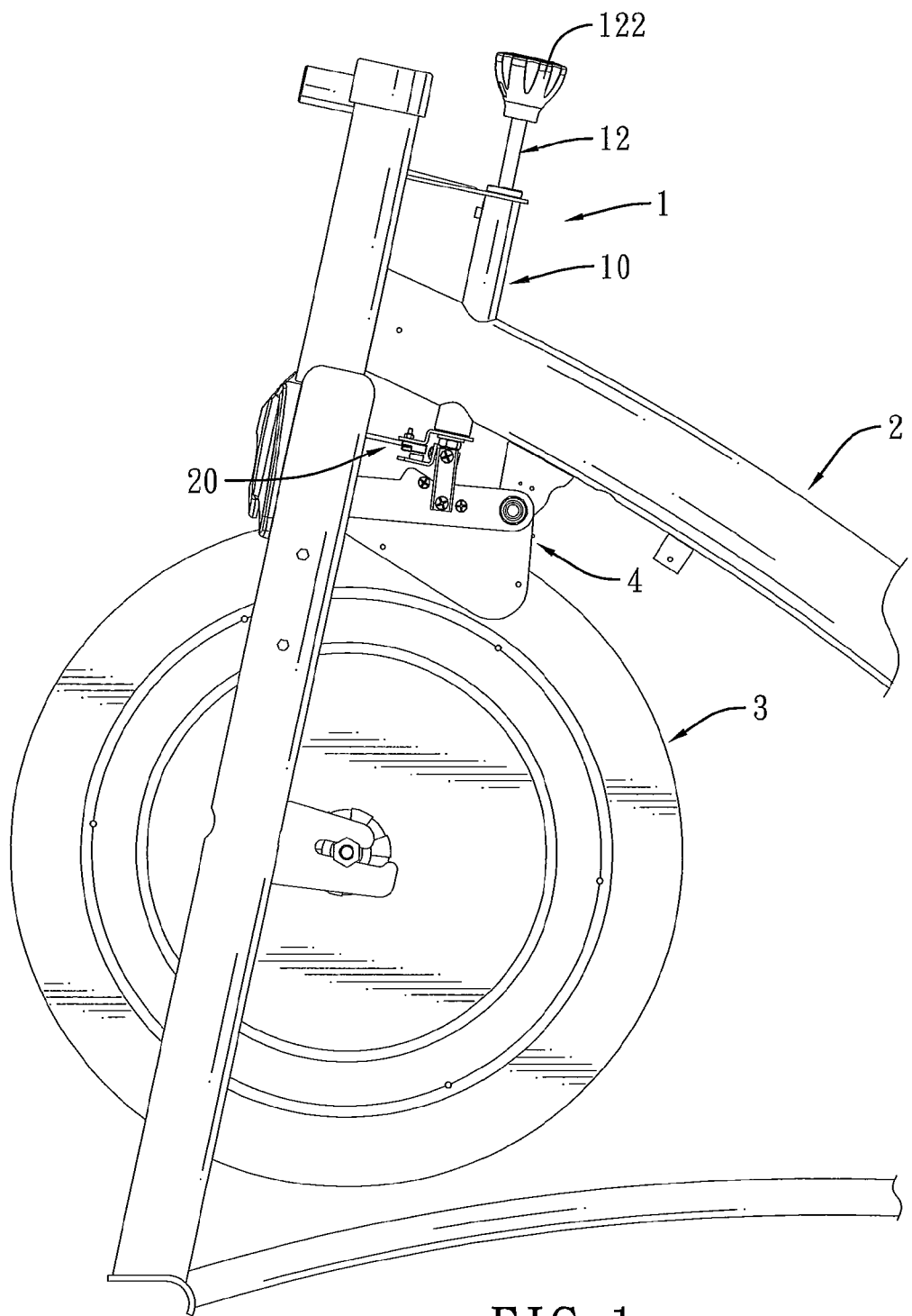
FIG. 1 is an operational side view of a torque sensing apparatus in accordance with the present invention mounted on a frame of an exercise bike.
Figure 2:
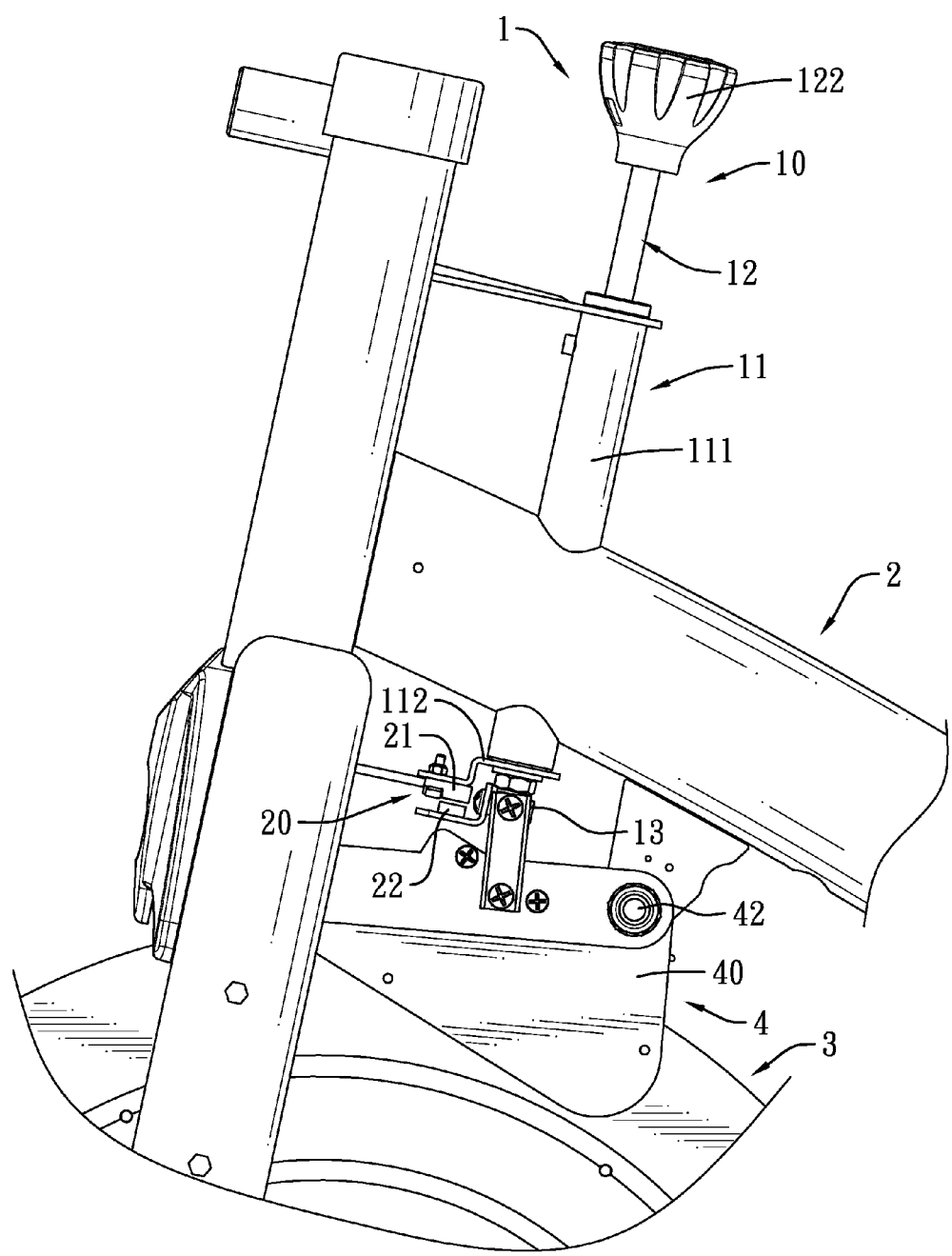
FIG. 2 is an enlarged operational side view of the torque sensing apparatus in FIG. 1.
Figure 4:
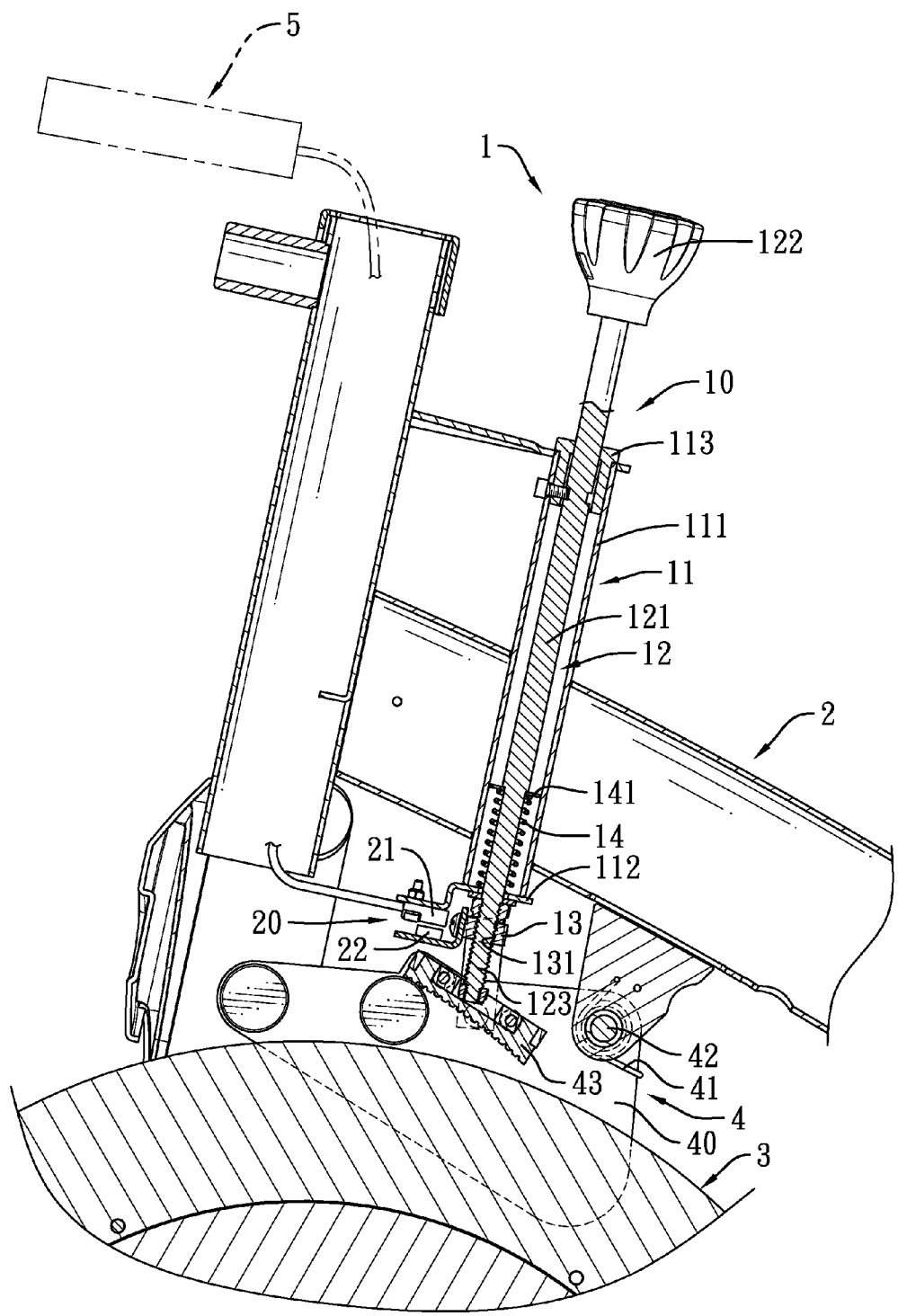
FIG. 4 is a side view in partial section of the torque sensing apparatus in FIG. 1 combined with a frame of an exercise bike, a flywheel and a torque supplier.

With reference to FIGS. 1 and 4, a torque sensing apparatus 1 in accordance with the present invention comprises a torque adjusting assembly 10 and a non-contact sensing assembly 20.

The torque adjusting assembly 10 has a fitting unit 11, a regulating rod 12 and a regulating seat 13. The fitting unit 11 has a tube 111, a fixed plate 112, a thimble 113, a spacer 141 and a spring 14. The tube 111 is hollow and has a first end and a second end being opposite to the first end. The fixed plate 112 is mounted on the first end of the tube 111. The thimble 113 is mounted into the second end of the tube. The spacer 141 is mounted in the tube 111. The spring 14 is mounted in the tube. The spring 14 has a top end and a bottom end. The top end of the spring 14 is connected with the spacer 141. The bottom end of the spring 14 is opposite to the top end of the spring 14 and is connected with the fixed plate 112 of the fitting unit 11.

The regulating rod 12 is rotatably mounted through the tube 111 of the fitting unit 11 and has a threaded part 123 protruding out of the fixed plate 112 of the fitting unit 11. The regulating rod 12 has a body 121 and a head 122. The body 121 has a connected end and a combining end. The threaded part 123 is formed on the connected end of the body 121. The combining end is opposite to the connected end of the body 121. The head 122 is mounted on the combining end of the body 121 and is located outside the second end of the tube 111.

The regulating seat 13 is movably mounted on the threaded part of the regulating rod 12 and located outside the fixed plate 112 of the fitting unit 11 and has a screw hole 131. The screw hole 131 is formed through the regulating seat 13. The threaded part 123 of the regulating rod 12 is screwed with and mounted through the screw hole 131 of the regulating seat 13. The regulating rod 12 can be turned to enable the regulating seat 13 to move along the axial direction of the regulating rod 12, such that a distance between the fixed plate 112 and the regulating seat 13 is changed.

The non-contact sensing assembly 20 has a first device and a second device. The first device is mounted on the fixed plate 112 of the fitting unit 11. The second device faces the first device and is mounted on the regulating seat 13. Moreover, the second device is kept from contacting the first device of the non-contact sensing assembly 20. One of the first device and the second device is adapted to detect a change of distance between the first device and the second device and then generates a signal.

The first device is an induction integrated circuit (IC) sensor 21 and the second device is a magnetic component 22. Or, the first device is a magnetic component 22 and the second device is an induction IC sensor 21. The induction IC sensor 21 comprises a Hall sensor, and the magnetic component 22 is a permanent magnet. The induction IC sensor 21 is adapted to connect with a controller 5, and the controller 5 gauges a torsional value of the torque adjusting assembly 10 according to the signal generated by the induction IC sensor 21. A change of the relative distance between the fixed plate 112 and the regulating seat 13 causes a change of magnetic flux between the induction IC sensor 21 and the magnetic component 22.

Figure 3:
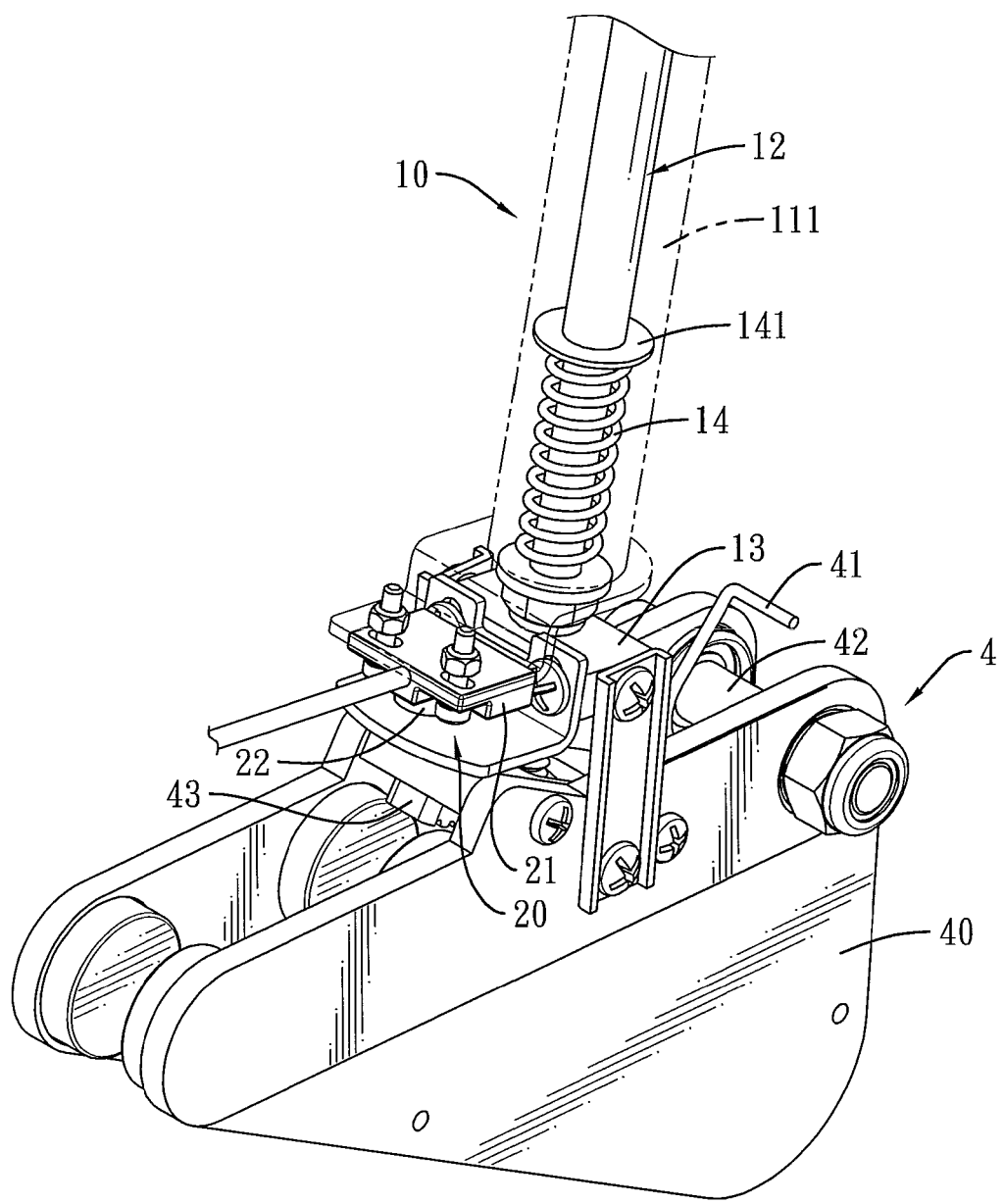
FIG. 3 is an operational perspective view of the torque sensing apparatus in FIG. 1 combined with a torque supplier.

With reference to FIGS. 1 and 3, the torque sensing apparatus 1 is mounted on an athletic equipment such as an exercise bike. The exercise bike has a frame 2, a flywheel 3, a torque supplier 4 and a controller 5. The flywheel 3, the torque supplier 4 and the controller 5 are mounted on the frame 2 of the exercise bike. The torque supplier 4 has a seat 40, a pivot shaft 42, a torsion spring 41 and a resistor 43. The seat 40 is pivoted on the frame 2 of the exercise bike by the pivot shaft 42. The seat 40 is connected to the regulating seat 13 with two pivot arms. With the arrangement of the pivot arms, the regulating seat 13 can be kept from rotating with the regulating rod 12 when the regulating rod 12 is rotating. The torsion spring 41 and the resistor 43 are mounted in the seat 40.

With reference to FIG. 4, the tube 111 of the torque adjusting assembly 10 is mounted on the frame 2. The regulating seat 13 is connected with the seat 40 of the torque supplier 4. The seat 40 keeps the regulating seat 13 from rotating with the regulating rod 12. Then, the regulating rod 12 is rotated to induce the regulating seat 13 to be axially moved along the regulating rod 12 and the seat 40 of the torque supplier 4 to be pivoted. The induction IC sensor 21 of the torque sensing apparatus 1 is connected with the controller 5 by a signal wire. The seat 40 pivoted can cause the change of the position of the resister 43, and then the resistor 43 is pressed to abut against the flywheel 3 and generates a torsional resistance to the flywheel 3.

To test the torque sensing apparatus, a torque-detecting device is assembled on the flywheel 3. The parameters of the regulating rod 12, such as rotating angles or rotating circles of the regulating rod 12, are recorded. The change of the parameters of the regulating rod 12 can change the relative distance between the induction IC sensor 21 and the magnetic component 22. Then, the change of the relative distance between the induction IC sensor 21 and the magnetic component 22 can change the magnetic flux between the induction IC sensor 21 and the magnetic component 22. Afterwards the induction IC sensor 21 detects the change of magnetic flux between the induction IC sensor 21 and the magnetic component 22 and generates a voltage value. The change of magnetic flux and the voltage value are recorded. Furthermore, a contrast table about the voltage value and the change of magnetic flux is built and recorded in the controller 5, and the torque-detecting device is then removed from the flywheel 3.

Figure 5:
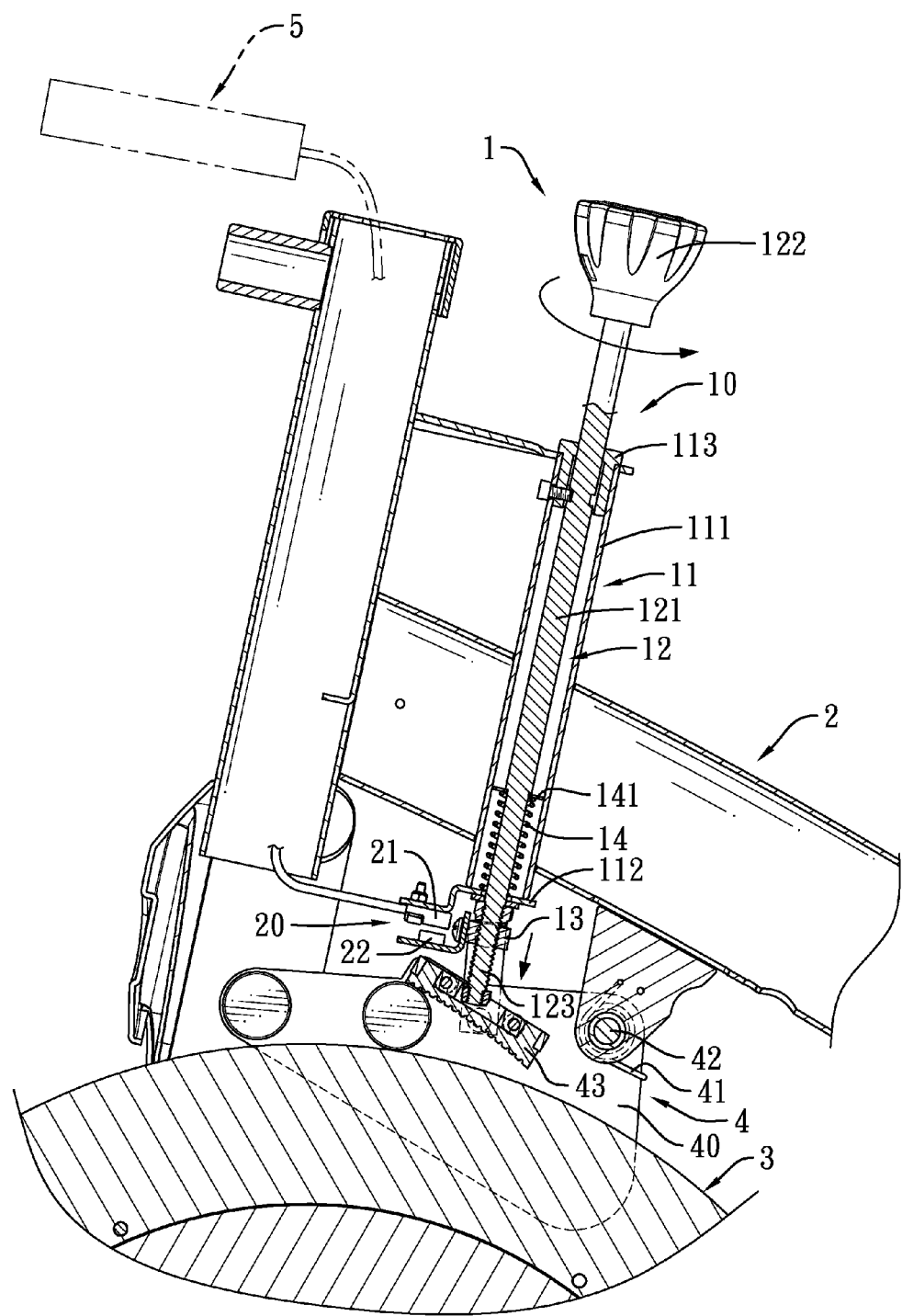
FIG. 5 is a side view in partial section of the torque sensing apparatus in FIG. 1 showing that a regulating rod changes a distance between a first device and a second device.

When the exercise bike is in use, a suitable torsion is set by means of turning the regulating rod 12. With reference to FIG. 5, the regulating seat 13 is axially moved along the regulating rod 12 when the regulating rod 12 is rotated, such that the relative distance between the regulating seat 13 and the fixed plate 112 of the fitting unit 11, the relative distance between the induction IC sensor 21 and the magnetic component 22, and the position of the resistor 43 of the torque supplier 4 are also changed. The change of the position of the resistor 43 can change the torsional resistance of the flywheel 3 pressed by the resistor 43. Furthermore, the controller 5 judges a corresponding torsion value based on the contrast table and the voltage value generated by the change of magnetic flux between the induction IC sensor 21 and the magnetic component 22. The corresponding torsion value is shown on a screen of the controller 5 to enable the user to read the valve directly and easily.

Accordingly, because the induction IC sensor 21 and the magnetic component 22 are not in contact, the non-contact sensing assembly 20 is not abraded and increases the precision of the torque sensing apparatus 1.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A torque sensing apparatus comprising:
   a torque adjusting assembly having:
      a fitting unit having:
         a first end; and
         a fixed plate mounted on the first end of the fitting unit;
      a regulating rod rotatably mounted through the fitting unit and having:
         a threaded part formed on the regulating rod and protruding out of the fixed plate of the fitting unit; and
      a regulating seat movably mounted on the threaded part of the regulating rod and located outside the fixed plate of the fitting unit and having:
         a screw hole formed through the regulating seat, and the threaded part of the regulating rod protruding through the screw hole of the regulating seat; and
   a non-contact sensing assembly having:
      a first device mounted on the fixed plate of the fitting unit; and
      a second device mounted on the regulating seat, wherein the second device is kept from contacting the first device, and the first device or the second device detects a change of distance between the first device and the second device and then generates a signal.

2. The torque sensing apparatus as claimed in claim 1, wherein the first device is an induction integrated circuit sensor, the second device is a magnetic component, and the induction integrated circuit sensor is adapted to connect with a controller.

3. The torque sensing apparatus as claimed in claim 1, wherein the first device is a magnetic component, the second device is an induction integrated circuit sensor, and the induction integrated circuit sensor is adapted to connect with a controller.

4. The torque sensing apparatus as claimed in claim 2, wherein the induction integrated circuit sensor comprises a Hall sensor, and the magnetic component is a permanent magnet.

5. The torque sensing apparatus as claimed in claim 3, wherein the induction integrated circuit sensor comprises a Hall sensor, and the magnetic component is a permanent magnet.

6. The torque sensing apparatus as claimed in claim 1, wherein
   the fitting unit comprises:

a tube being hollow and having:
- a second end formed on the tube and being opposite to the first end;
- a thimble mounted into the second end of the tube;
- a spacer mounted in the tube; and
- a spring mounted in the tube and having:
  - a top end connected with the spacer; and
  - a bottom end being opposite to the top end of the spring and connected with the fixed plate of the fitting unit; and the regulating rod has:
- a body having:
  - a connected end on which the threaded part is formed; and
  - a combining end being opposite to the connected end of the body; and
- a head mounted on the combining end of the body and located outside the second end of the tube.

7. The torque sensing apparatus as claimed in claim 2, wherein the fitting unit comprises:
- a tube being hollow and having:
  - a second end formed on the tube and being opposite to the first end;
  - a thimble mounted into the second end of the tube;
  - a spacer mounted in the tube; and
  - a spring mounted in the tube and having:
    - a top end connected the spacer; and
    - a bottom end being opposite to the top end of the spring and connected with the fixed plate of the fitting unit; and the regulating rod has:
- a body having:
  - a connected end on which the threaded part is formed; and
  - a combining end being opposite to the connected end of the body; and
- a head mounted on the combining end of the body and located outside the second end of the tube.

8. The torque sensing apparatus as claimed in claim 3, wherein the fitting unit comprises:
- a tube being hollow and having:
  - a second end formed on the tube and being opposite to the first end;
  - a thimble mounted into the second end of the tube; a spacer mounted in the tube; and
  - a spring mounted in the tube and having:
    - a top end connected with the spacer; and
    - a bottom end being opposite to the top end of the spring and connected with the fixed plate of the fitting unit; and the regulating rod has:
- a body having:
  - a connected end on which the threaded part is formed; and
  - a combining end being opposite to the connected end of the body; and
- a head mounted on the combining end of the body and located outside the second end of the tube.

9. The torque sensing apparatus as claimed in claim 4, wherein the fitting unit comprises:
- a tube being hollow and having:
  - a second end formed on the tube and being opposite to the first end;
  - a thimble mounted into the second end of the tube;
  - a spacer mounted in the tube; and
  - a spring mounted in the tube and having:
    - a top end connected with the spacer; and
    - a bottom end being opposite to the top end of the spring and connected with the fixed plate of the fitting unit; and the regulating rod has:
- a body having:
  - a connected end on which the threaded part is formed; and
  - a combining end being opposite to the connected end of the boy; and
- a head mounted on the combining end of the body and located outside the second end of the tube.

10. The torque sensing apparatus as claimed in claim 5, wherein the fitting unit comprises:
- a tube being hollow and having:
  - a second end formed on the tube and being opposite to the first end;
  - a thimble mounted into the second end of the tube;
  - a spacer mounted in the tube; and
  - a spring mounted in the tube and having:
    - a top end connected with the spacer; and
    - a bottom end being opposite to the top end of the spring and connected with the fixed plate of the fitting unit; and the regulating rod has:
- a body having:
  - a connected end on which the threaded part is formed; and
  - a combining end being opposite to the connected end of the body; and
- a head mounted on the combining end of the body and located outside the second end of the tube.

* * * * *